July 18, 1961 R. M. ROPPEL 2,993,201

ANALOGUE-TO-DIGITAL ENCODING SYSTEM

Filed March 21, 1952 2 Sheets-Sheet 2

INVENTOR
RICHARD M. ROPPEL

BY D. C. Snyder
Howard White
ATTORNEYS

United States Patent Office 2,993,201

Patented July 18, 1961

2,993,201

ANALOGUE-TO-DIGITAL ENCODING SYSTEM

Richard M. Roppel, Washington, D.C.

Filed Mar. 21, 1952, Ser. No. 277,890

3 Claims. (Cl. 340—347)

Figure 2:
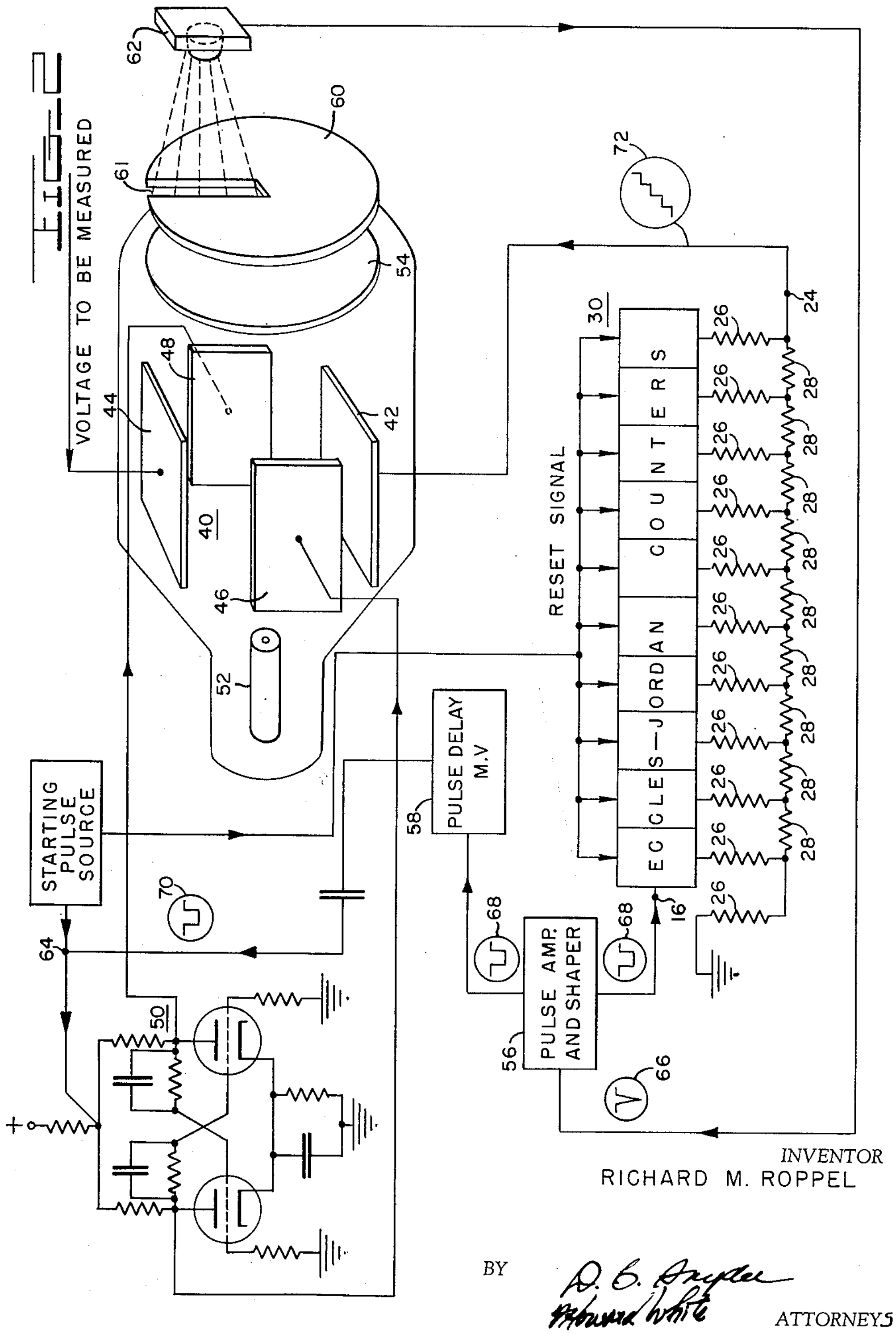

(Granted under Title 35, U.S. Code (1952), sec. 266)

This invention relates generally to voltage measuring devices and more particularly to a system for converting information expressed in terms of voltage amplitude into binary form.

A voltage-measuring function for which the present invention has been found particularly well suited occurs in the field of electronic computers where in many applications it becomes particularly desirable to precisely evaluate a voltage whose amplitude represents a specific number. In some operations it is advantageous to make as many as 200 such evaluations per minute. To obtain such rapid evaluations it has been found desirable to precisely compare the amplitude of the voltage with a generated voltage whose amplitude can be indicated with binary counters. This means of evaluation provides not only a sufficiently rapid operation but also will convert the voltage from analogue to digital or binary form, which is a more desirable form for many computer functions.

It therefore is an object of this invention to provide a means for very precisely comparing the amplitude of one voltage with that of a generated voltage whose amplitude can be indicated with binary counters.

It is a further object of this invention to provide a means which operates at extremely high speed for precisely comparing the amplitude of one voltage with that of a generated step by step voltage whose amplitude can be indicated with binary counters.

It is a further object of this invention to provide a means for comparing the amplitude of one voltage with that of a generated step by step voltage whereby information expressed in terms of voltage amplitude will be converted into binary form.

It is a further object of this invention to provide a voltage comparing means which includes a multistage binary counter having an integrating matrix for generating a voltage whose amplitude can be indicated with binary counters.

It is a further object of this invention to provide a voltage-comparing means which includes a cathode ray device, a mask masking a portion of the cathode ray target and a photocell which is activated each time the electron stream sweeps the target until the voltage applied to one plate of a pair of deflection plates equals the voltage applied to the other plate of the pair of deflection plates at which time the electron stream will be hidden from the photocell by the mask.

Other objects and features of this invention will become apparent upon a careful consideration of the following detailed description, when taken together with the accompanying drawings in which:

FIGURE 1 discloses the matrix of the novel voltage amplitude comparison system;

FIGURE 2 is a showing, partly in block diagram and partly in schematic, of the novel voltage amplitude comparison system.

The invention, in broad terms, contemplates encoding an analogue voltage into a digital voltage by placing the analogue voltage on a vertical deflection plate of a cathode-ray tube and placing a locally generated step voltage of which each step represents one decimal digit on the opposite vertical deflection plate of the cathode-ray device. When these two voltages are approximately equal the cathode ray beam will no longer be deflected vertically and in response thereto the step voltage generator ceases operation and an indication in binary form may be read from a binary counter which has been recording each step of the step voltage. Further, the number, which is now encoded in binary form, will be available for storage or for further computer operations, as may be desired.

In order to properly understand the operation of this invention, a brief explanation of the theory of the binary system of counting is appropriate. The principle of operation of the binary system is based directly upon the definition of a binary number. Each digit of a binary number is either zero or one and in each successive number only one digit changes form. The changes usually succeed as in a decimal number beginning at the right. A 5-digit binary number, $D_1D_2D_3D_4D_5$, in which $D_1$, $D_2$, $D_3$, $D_4$, $D_5$ each represent either of two binary digits, 0 or 1, may be defined as:

$$D_1D_2D_3D_4D_5 = D_1\times 2^4 + D_2\times 2^3 + D_3\times 2^2 + D_4\times 2^1 + D_5\times 2^0$$

Thus for example, $$10101 = 1\times 2^4 + 0\times 2^3 + 1\times 2^2 + 0\times 2^1 + 1\times 2^0 = 21 \text{ in the decimal system.}$$

Therefore it can be seen a binary number is evaluated by multiplying each digit by the power of 2 associated with that digit.

Referring to FIGURE 1, a circuit for generating a step voltage of predetermined equal steps is shown. As can be seen from this figure, a series of voltage sources are used. In the preferred embodiment, ten voltage sources were used. The voltage sources may be relays, commutators with slip rings, or, as used in the preferred embodiment, Eccles-Jordan flip-flop or counter circuits. Since each of these flip-flop circuits is exactly alike, it is believed a detailed explanation of one and its connection with the rest will be sufficient.

Reference number 10, FIGURE 1, designates each of these counter stages. Each counter circuit has two tubes 12 and 14. The plate of each tube is directly coupled to the grid of the other tube. Each of the ten identical counter stages possesses two stable conditions of equilibrium. One condition is when tube 12 is conducting and tube 14 is cut off; the other condition is when tube 12 is cut off and tube 14 is conducting. Each stage is interconnected in a regenerative manner so that one tube in each flip-flop or counter stage will always be conducting and the other tube non-conducting. The counter stage will remain in one condition until it receives some small electrical disturbance of a particular polarity. Whereupon, this disturbance will be regeneratively amplified until the conditions of the tubes are reversed. The plate of each tube in each stage is connected through a plate resistor to a plate voltage supply. The grids of each of the tubes are each connected through a respective resistor to a negative voltage supply. The cathodes of each of the tubes are connected to a source of negative voltage. The input to the first counter stage 10 is connected to point 16 and applied in parallel to the control grids 18 and 20 of tubes 12 and 14, while the input to the second counter stage is obtained from the plate of tube 14 and applied in parallel to grids of the two tubes making up the second counter stage. The function of this coupling circuit between the first and second counter stages is to apply to the grids of the second counter stage a negative pulse each time tube 14 passes from non-conduction to conduction and a positive pulse each time tube 14 passes from conduction to non-conduction. It should be noted that the remaining counter stages are connected in exactly the same manner as are the two described above.

By constructing a counter circuit with the tubes as shown, each stage is made to respond only when a negative pulse is applied to the control grids, so a total of 1024 negative impulses are required at input 16 to cause the complete counter circuit consisting of 10 counter stages to pass through a complete cycle of operation. In tracing a cycle of operation, the original or zero state of the entire counter circuit is set by a reset pulse, whose origin will be discussed later, which opens the relay switches 22 which opens the cathode circuit of tube 12 in each of the counter stages and all of the counter stages are reset to zero simultaneously. Applying the reset pulse to relay switches 22 causes tubes 12 to become non-conducting and tubes 14 to become conducting. Following the reset pulse all the relays of the counter stages close. In response to the first negative input pulse applied to point 16, tube 12 of the first counter is made conducting and tube 14 is made non-conducting. Since tube 14 would transmit a positive pulse to the next counter stage, none of the counter stages following first counter stage 10 would change their condition of equilibrium. Upon reception of the next negative pulse tube 14 of first counter stage 10 will become conducting and transmit a negative pulse to the next counter stage. This will change the equilibrium condition of this counter stage. Thus it can be seen that the counter stages are only responsive to negative pulses and operate in a manner which is conventional and well-known in the binary counter art. Further, when tube 12 in each counter stage 10 is conducting, each counter will be representing the binary digit 1, when tube 14 of each counter stage 10 is conducting, each counter will be representing the binary digit 0.

Connected to the plate of each right hand tube 14 is a series of resistances which form a part of the system matrix 30. These resistances are of equal value and are represented by reference numeral 26, as shown in FIGURES 1 and 2. Serially connecting the other end of each of these resistors 26 are another series of resistors 28, also shown in FIGURES 1 and 2. These resistors 28 are ½ the value of resistors 26. Thus it can be seen that resistors 26 are in series with the counter stages and resistors 28 form a series of shunt resistors.

An approximately equal positive voltage is applied to the plate end of each resistance 26 each time its respective counter tube 14 is non-conducting. When the tube is conducting the voltage should be zero. As may be shown mathematically, by means of the integrating resistors 26 and 28 a step voltage of equal increments as indicated at 72 in FIGURE 2 is produced at point 24 in response to the application of negative pulses to the input 16 of the first counter stage. Each input pulse raises the output voltage at 24 by one step. Immediately after the counter stages have been reset by relays 22, all the right hand counter tubes are conducting and the voltage at point 24 is substantially zero. It will be apparent from inspection of the circuit that as more and more pulses are counted, a right hand counter tube nearer the output terminal 24 is cut off, and since a tube nearer the output terminal is coupled to the output terminal through fewer resistors a higher voltage is maintained until the maximum counting range of the counter is reached and all right hand tubes are non-conducting. When this condition is reached the voltage at 24 is substantially equal to B+. By using equal value resistors at 26 and at 28 with the latter equal to half the former, the resistance values may be small enough to be accurately calibrated and to permit operation with a 10 stage counter. It will be seen that the voltage at 24 as depicted at 72 will vary from 0 to B+ in 1023 equal increments.

The output of the system matrix 30 is applied to one vertical deflection plate 42 of a cathode-ray tube 40. Upon the opposite vertical deflection plate 44 of the cathode-ray tube 40, the voltage to be measured or encoded is applied. This voltage is the electrical analogue of any parameter which it is desired to feed into a digital computer.

A bistable multivibrator 50, shown in FIGURE 2, is used to supply sweep voltage to the horizontal deflection plates 46 and 48 of the cathode-ray tube 40. This voltage, of course, causes the electron stream from the electron gun 52 of the cathode-ray tube 40 to sweep the target 54. The target for the electron gun is the usual cathode ray tube fluorescent screen which produces visible light when struck by the electron beam. Since bistable multivibrator 50 is generating output voltages of alternating opposite polarity, the electron stream is caused to periodically sweep back and forth across the target. It is, of course, understood that the sweep voltage need be applied only to one horizontal deflection plate and the system operation would be satisfied.

Reference numeral 56 designates a pulse amplifier and shaper whose output is connected in parallel to a pulse delay multivibrator 58 and to input point 16 of the first counter stage 10. These elements are shown in FIGURE 2. Since each of these elements are well-known and conventional, no explanation of their circuits is deemed to be necessary.

In front of the cathode-ray tube 40 and masking all of the target 54 except for a small vertical slit 61 is a mask 60 made out of cardboard or any other opaque material. Mounted in front of the mask 60 is a photoelectric cell 62 disposed to detect the fluorescent light seen through slit 61 and produced by the sweeping of the electron beam across the portion of target 54 exposed by slit 61. It is to be expressly understood that any other electronic beam detecting system could be used in place of the mask 60 and photoelectric cell 62.

The operation of the apparatus is as follows: A starting pulse is introduced in parallel to the anode circuit, point 64 of bistable multivibrator 50, and to the reset relays of the counter stages, which serves to trigger the bistable multivibrator 50 and also serves to reset the ten counter stages. Thus it can be seen by introducing the starting pulse, square wave generator 50 is activated and counter stage 10 and all the remaining counter stages are set to zero. Also at the same time, the analogue voltage is placed upon vertical deflection plate 44 of cathode-ray tube 40. This voltage is introduced with proper polarity to deflect the beam towards the upper part of the slit 61. The output from the bistable multivibrator 50 is placed upon one or both of the horizontal deflection plates 46 and 48 causing the electron beam to sweep once across the target 54. Each time the electron beam crosses the portion of the target exposed to the photoelectric cell 62 by slit 61, the light produced on the fluorescent target by the electron beam is detected and a signal 66 is generated by the photocell. The waveform of the signal 66 is shown in FIGURE 2. Signal 66 is amplified and shaped by the pulse amplifier and shaper 56 and a negative output pulse 68 is produced. Pulse 68 is fed in parallel to the pulse delay multivibrator 58 and to input point 16 of the first counter stage. Reception of this pulse 68 causes the first counter stage to fire and the generated voltage produced at point 24 is fed to vertical deflection plate 42 of the cathode-ray tube 40 causing the electron beam to be deflected downward. Pulse 68 is also fed from the pulse amplifier and shaper 56 to the pulse delay multivibrator 58. Here the pulse 68 is delayed in order that the square wave generator 50 will not become free-running. In the preferred embodiment, a 10 microsecond delay was introduced. The delayed pulse 70, see FIGURE 2, again triggers the bistable multivibrator 50 causing the electron beam to sweep across the target 54 generating a new pulse 66. The cycle therefore is repeated and each time the counter generates a step higher voltage and the electron beam is deflected downward one step. The voltage generated by the counters and produced at point 24 is a step by step waveform and is shown in FIGURE 2 by reference numeral 72. When the voltage on one deflection plate 42 equals the analogue voltage on the opposite vertical deflection plate 44, the electron beam will strike the target 54 at a point below the slit in the mask 60. The photoelectric cell 62 will not detect any signal, therefore the bistable multivibrator 50 will not be retriggered and the cycle will cease. As a result, no further signals are applied to the counters. The counters will have a number, in binary form, registered upon them which is the equivalent to the number value of the analogue voltage placed upon the vertical deflection plate 44. Any form of indicator may be used to indicate the number and the number may at the same time be stored upon a magnetic drum or any other storage device for future use. Although no specific form of indicators have been shown, neon tube indicators, such as shown in the patent to Miller No. 2,407,320 issued September 10, 1946 could be used.

From the foregoing description of the present invention, it is apparent that considerable modification of the features thereof is possible without exceeding the scope of the invention which is defined in the appended claims.

The invention described herein may be manufactured and used by or for the Government of the United States of America for governmental purposes without the payment of any royalties thereon or therefor.

What is claimed is:

1. A comparison system for comparing an unknown voltage with a step by step voltage of known increments comprising a source of said step-by-step voltage, a cathode ray device having an electron beam, horizontal and vertical deflection plates, and an electron beam target means, said target means having a narrow vertical reference area defined thereon, said step by step voltage being applied to one vertical deflection plate and the unknown voltage being applied to the opposite vertical deflection plate for producing an opposite direction of deflection, a bistable multivibrator connected to one horizontal deflection plate for sweeping said beam across said reference area when it is vertically deflected by an unknown voltage, detecting means generating a trigger pulse each time said beam horizontally crosses said target reference area, means connecting said trigger pulse from said detecting means to said bistable multivibrator and said step-by-step voltage source thereby firing said bistable multivibrator and increasing said step by step voltage by one increment in response to each trigger pulse.

2. A voltage amplitude comparison and binary encoding system comprising, a multistage binary counter having an integrating matrix connected thereto for producing a step-wise voltage increasing one step for each applied voltage pulse, a cathode ray device producing an electron beam and having a pair each of vertical and horizontal deflection plates and a phosphorescent target a mask disposed in front of said target, said mask having a narrow vertical slit formed therein, said electron beam being normally displaced just below said slit, the signal voltage to be compared and encoded being applied to one vertical deflection plate to deflect said beam upward into the region of said slit, said step-wise voltage being connected to the other vertical deflection plate to deflect said beam downward, a bistable multivibrator connected across the horizontal deflecting plates for sweeping the beam across said slit, a photoelectric device adjacent said slit for producing a pulse each time said beam crosses said slit, means connecting said pulse as an input to said binary counter stage and as a trigger pulse to said multivibrator, the conductive condition of said counter stages after the deflection introduced by said signal voltage has been step-wise reduced to zero being a representation in binary form of the amplitude of said signal voltage.

3. A comparison system for comparing an unknown voltage with a step by step voltage of known increments comprising a source of said step by step voltage, a cathode ray device having an electron beam, horizontal and vertical deflection plates, and an electron beam target means, said target means having a narrow vertical reference area defined thereon, said step by step voltage being applied to one vertical deflection plate and the unknown voltage being applied to the opposite vertical deflection plate for producing an opposite direction of deflection, a bistable multivibrator connected to one horizontal deflection plate for sweeping said beam across said reference area when it is vertically deflected by an unknown voltage, detecting means generating a trigger pulse each time said beam horizontally crosses said target reference area, means connecting said trigger pulse from said detecting means to said bistable multivibrator and said step by step voltage source thereby firing said bistable multivibrator and increasing said step by step voltage by one increment in response to each trigger pulse, and means for counting the number of trigger pulses generated by said detecting means in response to the application of an unknown voltage.

References Cited in the file of this patent

UNITED STATES PATENTS

| | | |
|---|---|---|
| 2,435,841 | Morton et al. | Feb. 10, 1948 |
| 2,563,395 | Carpentier | Aug. 7, 1951 |
| 2,568,724 | Earp et al. | Sept. 25, 1951 |
| 2,596,741 | Tyler et al. | May 13, 1952 |
| 2,717,994 | Dickinson et al. | Sept. 13, 1955 |

OTHER REFERENCES

Barney: The Binary Quantizer-Electronic Engineering for November 1949, pp. 962 to 967, photo in 235–61.